(12) United States Patent
Fort

(10) Patent No.: US 7,905,097 B1
(45) Date of Patent: Mar. 15, 2011

(54) WATER-FROM-AIR SYSTEM USING A DESICCANT WHEEL

(75) Inventor: James H. Fort, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/573,228

(22) Filed: Oct. 5, 2009

(51) Int. Cl.
*F25D 17/06* (2006.01)

(52) U.S. Cl. ............................................. 62/94; 62/271

(58) Field of Classification Search ................ 62/93, 94, 62/271, 272, 285, 291, 476, 478, 483, 485; 165/8, 121
See application file for complete search history.

(56) References Cited

U.S. PATENT DOCUMENTS

| | | | |
|---|---|---|---|
| 4,146,372 A | | 3/1979 | Groth et al. |
| 4,285,702 A | | 8/1981 | Michel et al. |
| 4,299,599 A | | 11/1981 | Takeyama et al. |
| 4,365,979 A | | 12/1982 | Takeyama et al. |
| 5,782,104 A | * | 7/1998 | Sami et al. ........................ 62/271 |
| 5,846,296 A | | 12/1998 | Krumsvik |
| 6,029,467 A | * | 2/2000 | Moratalla ........................ 62/271 |
| 6,116,034 A | | 9/2000 | Alexeev et al. |
| 6,336,957 B1 | | 1/2002 | Tsymerman |
| 6,511,525 B2 | | 1/2003 | Spletzer et al. |
| 6,557,365 B2 | * | 5/2003 | Dinnage et al. .................. 62/271 |
| 6,644,059 B2 | * | 11/2003 | Maeda et al. .................... 62/271 |
| 6,863,711 B2 | | 3/2005 | Tongue et al. |
| 7,043,934 B2 | * | 5/2006 | Radermacher et al. .......... 62/285 |
| 7,050,707 B1 | * | 5/2006 | Lin .................................. 392/360 |
| 7,251,945 B2 | | 8/2007 | Tongue |
| 7,308,798 B2 | * | 12/2007 | Caggiano ............................ 62/63 |
| 7,326,277 B1 | * | 2/2008 | Cohen et al. ..................... 95/113 |
| 7,384,454 B2 | | 6/2008 | Tongue |
| 7,428,821 B2 | * | 9/2008 | Kashirajima et al. ........... 62/271 |
| 7,467,523 B2 | | 12/2008 | Vetrovec et al. |
| 7,601,206 B2 | * | 10/2009 | Call et al. ........................ 96/125 |
| 2005/0150378 A1 | * | 7/2005 | Dunne et al. ..................... 95/113 |
| 2007/0028769 A1 | * | 2/2007 | Eplee et al. ...................... 95/113 |
| 2007/0101862 A1 | | 5/2007 | Tongue |
| 2009/0139254 A1 | * | 6/2009 | Landry ............................ 62/271 |

* cited by examiner

*Primary Examiner* — Mohammad M Ali
(74) *Attorney, Agent, or Firm* — Cantor Colburn LLP

(57) ABSTRACT

A water-from-air extraction system (40) includes a first open air passage (43) including a first portion (51) and a second portion (64) with the first portion (51) being fluidly linked to the second portion (64). A desiccant wheel (60) is arranged between the first and second portions (51,64). The water from air extraction system (40) further includes a second open air passage (44) including a first end portion (82) that leads to a second end portion (123) through an intermediate portion (108). The first and second end portions (82, 123) are fluidly connected to the first portion (51) of the first open air passage (43) and the intermediate section (108) is fluidly linked to the desiccant wheel (60). A condensing heat exchanger (114) is fluidly connected to the intermediate section (108) of the second open air passage (44) downstream from the desiccant wheel (60). The condensing heat exchanger (114) extracts water from an air flow passing through the second open air passage (44).

12 Claims, 3 Drawing Sheets

WATER-FROM-AIR SYSTEM USING A DESICCANT WHEEL

BACKGROUND OF THE INVENTION

The subject matter disclosed herein relates to the art of water-from-air systems and, more particularly, a water-from-air system that employs a desiccant wheel.

Obtaining water from dry, arid, and/or desert regions is difficult. Typically, water is either found locally from a well or must be trucked in by tankers. In certain environments, obtaining well water is not an option or, if available, the water may contain contaminants that could be harmful to certain humans. In such cases, the water must be brought in by tanker trucks. The costs associated with transporting water are relatively high. Fuel costs, vehicle maintenance costs, and ensuring water quality all contribute to the overall cost of transporting water to remote locations. Alternatively, water can be extracted from air at the remote location. That is, in place of transporting water to the remote location, a water-from-air extraction system can be employed.

Certain water-from-air extraction systems, such as indicated at 2 in FIG. 1, employ a desiccant wheel 3 fluidly connected to an open air passage 4, and a closed air or extraction loop 6. Open air passage 4 carries process air, such as ambient air, exhaust air or the like from a process fan 8 to desiccant wheel 3. The process air then passes from desiccant wheel 3 back to ambient. In contrast, in closed air loop 6 the same air is re-circulated through desiccant wheel 3 to pick up moisture. More specifically, in the embodiment shown, saturated air flows from a regeneration fan 14 through a heater 16. The heater dries the air which then flows through desiccant wheel 3 to absorb moisture deposited by the process air. The moisture laden or saturated air passes from desiccant wheel 3 to a condenser 20. A fan directs an air flow across condenser 20 causing a portion of the moisture in the saturated air to condense and pass to a water storage area 24. With the portion of the moisture removed, the saturated air passes back to regeneration fan 14 and onto heater 16 to repeat the process.

While effective, closed loop systems require the use of an additional fan or air motive device to ensure air movement. In the above described system, fan 14 is exposed to saturated air or air having a very high moisture content. The high moisture content of the air creates certain maintenance issues. The moisture in the air has a detrimental effect on fan components such as bearings and electrical connections. Thus, the operational life of fans in a closed loops system is rather short. In addition, there are certain costs associated with driving the additional fan. For example, fuel to run generators that create the electricity to drive the various components of the water-from-air system must be transported out to the remote area.

BRIEF DESCRIPTION OF THE INVENTION

According to one aspect of the invention, a water-from-air extraction system includes a first open air passage including a first portion and a second portion with the first portion being fluidly linked to the second portion. A desiccant wheel is arranged between the first and second portions. The water from air extraction system further includes a second open air passage including a first end portion that leads to a second end portion through an intermediate section. The first and second end portions are fluidly connected to the first portion of the first open air passage and the intermediate section is fluidly linked to the desiccant wheel. A condensing heat exchanger is fluidly connected to the intermediate section of the second open air passage downstream from the desiccant wheel. The condensing heat exchanger extracts water from an air flow passing through the second open air passage.

According to another aspect of the invention, a method of extracting water from air include directing a first portion of process air into a first open air passage, directing a second portion of process air into a second open air passage fluidly connected to the first open air passage, guiding the second portion of the process air through a desiccant wheel, introducing the second portion of process air back into the first portion of process air at a mixing point forming a mixed air stream, and extracting water from the second portion of process air upstream from the mixing point.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION OF THE INVENTION

Figure 1:
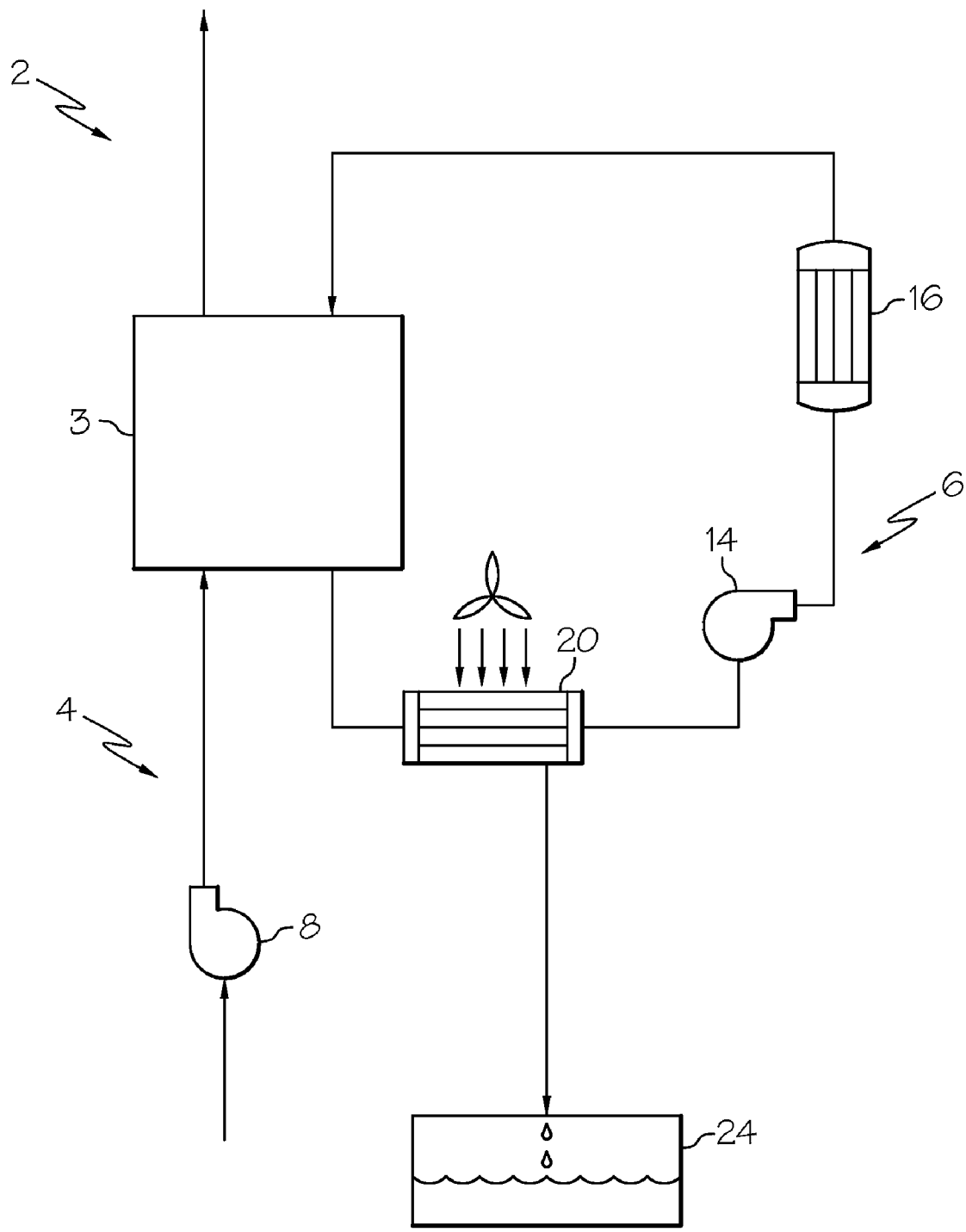
FIG. 1 is schematic block diagram of prior art water-from-air system employing a desiccant wheel coupled to a closed loop air system.
Figure 2:
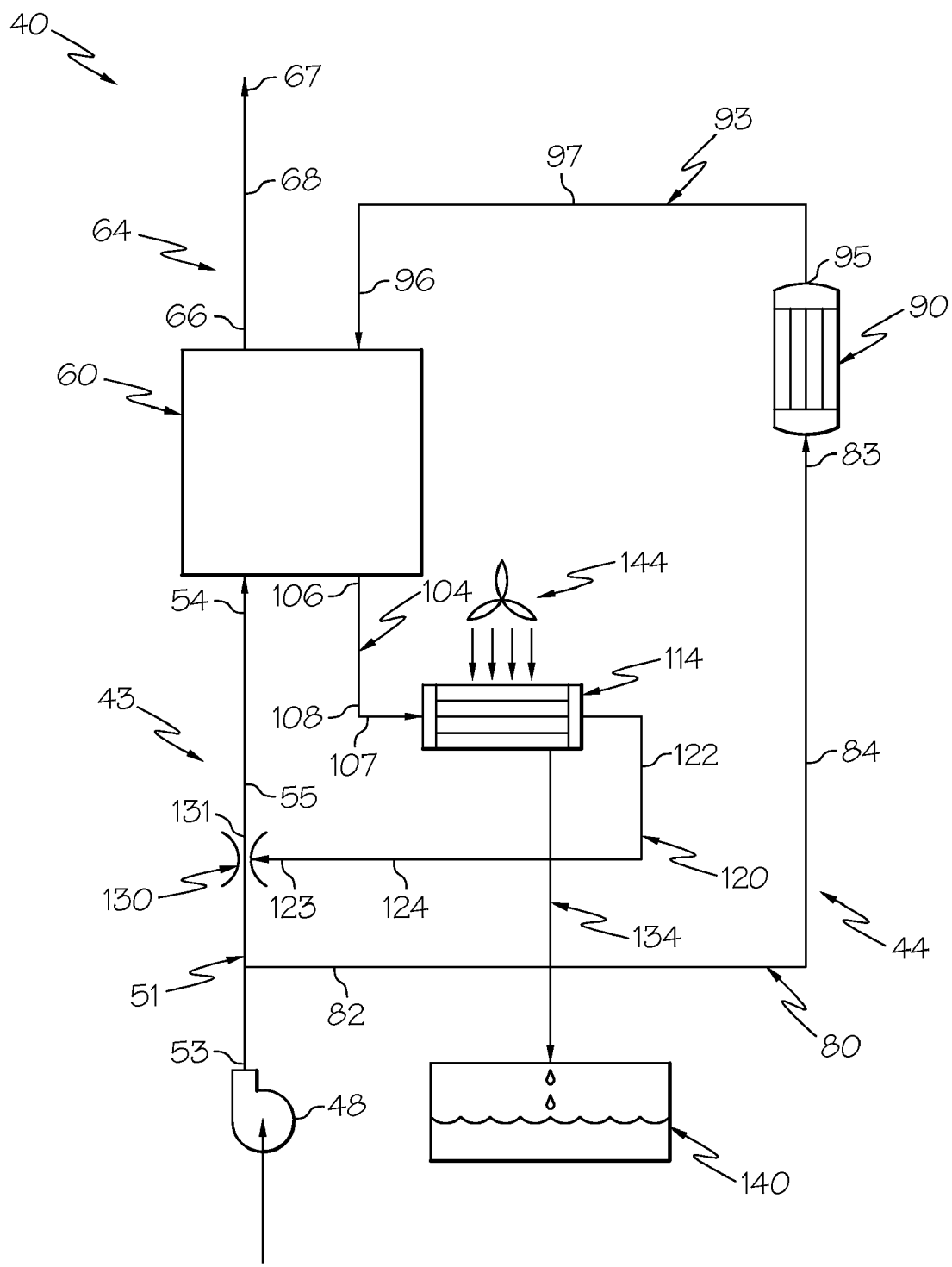
FIG. 2 is a schematic block diagram of a water-from-air extraction system in accordance with an exemplary embodiment.

With reference to FIG. 2, a water-from-air extraction system constructed in accordance with an exemplary embodiment is indicated generally at 40. Water-from-air extraction system 40 includes a first open air passage 43 that carries process air as well, and a second open air passage 44 that carries extraction or heated air. A process fan or air motive device 48 is operationally connected to first open air passage 43. More specifically, first open air passage 43 includes a first portion 51 having a first end 53 that is fluidly connected to process fan 48. First end 53 extends to a second end 54 through an intermediate portion 55. Second end 54 is fluidly linked to a desiccant wheel 60. In addition, first open air passage 43 includes a second portion 64 that leads from desiccant wheel 60. Second end portion 64 includes a first end 66 that is fluidly connected to desiccant wheel 60 and extends to a second end 67 through an intermediate portion 68.

As further shown in FIG. 2, second open air passage 44 includes a first section 80 having a first end portion 82 that is fluidly connected to intermediate portion 55 of first open air passage 43. First end portion 82 extends to a second end portion 83 through an intermediate section 84. A heater 90 is fluidly connected to second end portion 83 of first section 80. Heater 90 leads to a second section 93. More specifically, second section 93 includes a first end portion 95 fluidly connected to heater 90. First end portion 95 extends to a second end portion 96 that is fluidly connected to desiccant wheel 60. First end portion 95 extends to second end portion 96 through an intermediate section 97.

Second open air passage 44 further includes a third section 104 that leads from desiccant wheel 60. More specifically, third section 104 includes a first end portion 106 that is fluidly connected to desiccant wheel 60. First end portion 106 extends to a second end portion 107 through an intermediate section 108. A condensing heat exchanger or condenser 114 is fluidly connected to second end portion 107. Condensing heat exchanger 114 includes a plurality of fins not shown as well as a plurality of passages (also not shown) that extend through the fins. Condensing heat exchanger 114 is fluidly connected to a fourth section 120 of second open air passage 44.

Fourth section 120 includes a first end portion 122 that extends to a second end portion 123 through an intermediate section 124. Second end portion 123 of fourth section 120 is fluidly linked to intermediate portion 55 of first open air passage 43. More specifically, second end portion 123 is fluidly linked to intermediate portion 55 through an ejector 130 that defines a mixing point 131. As shown, mixing point 131 is located downstream from first end portion 82. With this arrangement, the motive force for moving air through both open air passages 43 and 44 is derived from fan 48. Moreover, the particularly the location of fan 48 ensured that the airflow is not saturated thereby minimized maintenance concerns related to moisture. In further accordance with the exemplary embodiment, condensing heat exchanger 114 includes a conduit 134 that leads to a water storage area 140. As will be discussed more fully below, a condenser fan 144 guides an air flow across the fins (not shown) on condensing heat exchanger 114 causing water entrained within the saturated air to condense and flow to water storage area 40.

Figure 3:
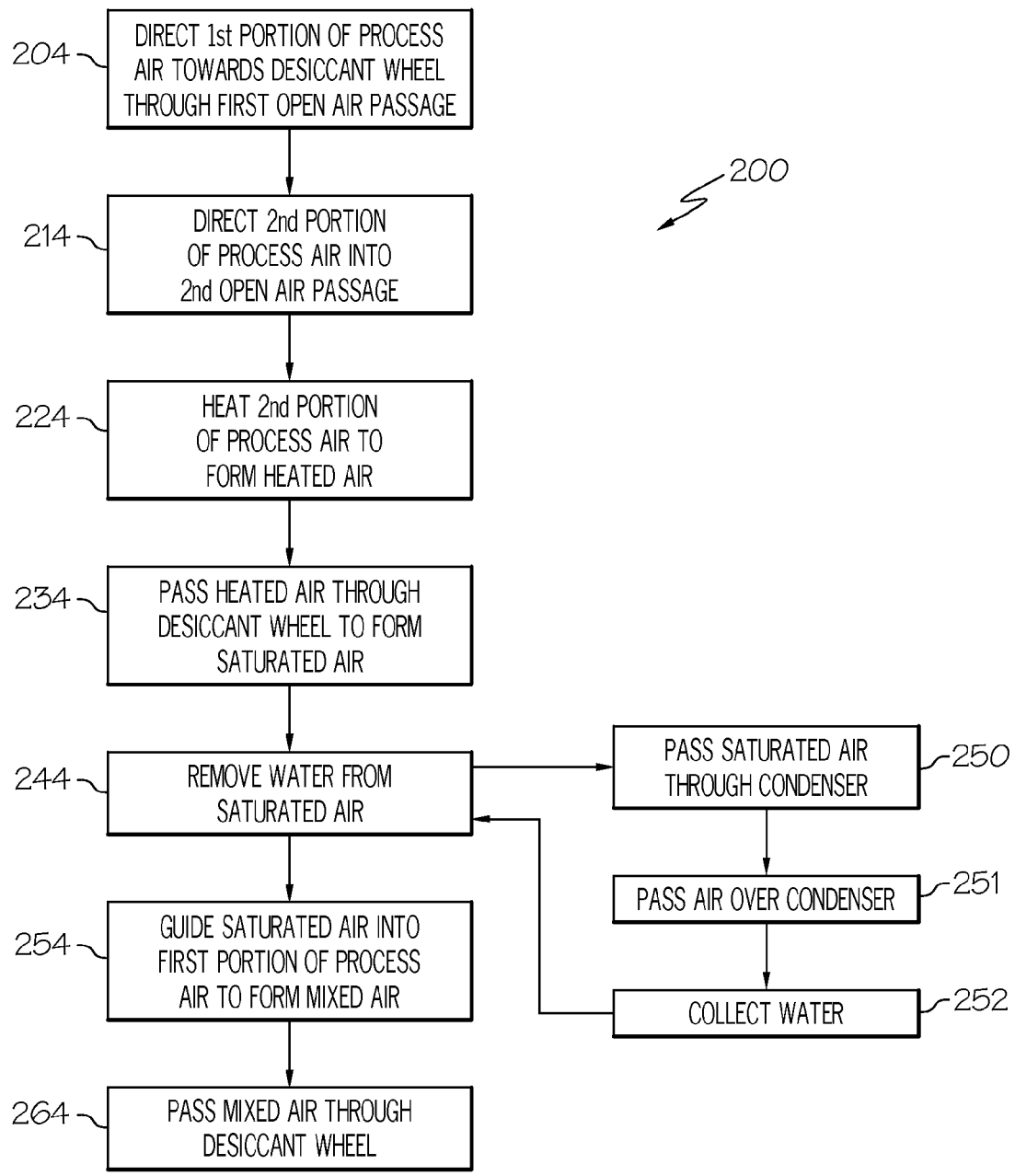
FIG. 3 is a block diagram illustrating a method of extracting water from air in accordance with the exemplary embodiment.

Reference will now be made to FIG. 3 in describing a method 200 of extracting water from air in accordance with the exemplary embodiment. Initially, process fan 48 is activated to direct a first portion of process air toward desiccant wheel 60 through first open air passage 43 as indicated in block 204. A second portion of the process air is directed into second open air passage 44 via first section 80 as indicated in block 214. The second portion of process air is heated to form heated air while passing through heater 90 as indicated in block 224. The heated air is passed through desiccant wheel 60 to form saturated air as indicated in block 234. More specifically, the heated air passing through desiccant wheel 60 collects moisture from the process air also passing through desiccant wheel 60.

At this point, the saturated air is passed to condensing heat exchanger 114 to remove water from saturated air as indicated in block 224. More specifically, the saturated air is passed through condenser 114 as indicated in block 250. An air flow, generated by fan 144, passes over condenser 114 causing a portion of the water entrained within the saturated air to condense as indicated in block 251. The condensed water is then collected within water storage area 140 as indicated in block 252. After passing through condensing heat exchanger 114, the saturated air is guided into the first portion of process air at mixing point 131 to form a mixed air flow as indicated in block 254. The mixed air flow is then passed through desiccant wheel 60 as indicated in block 264. With this arrangement, the extraction air flowing through second open air passage 44 derives a motive or flow force from process fan 48. In this manner, there is no need for an additional fan that would necessarily be exposed to moisture laden air within second open air passage 44. In addition, by reintroducing saturated air into the process air, additional moisture can be extracted to enhance extraction efficiency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A water-from-air extraction system (40) comprising:
   a first open air passage (43) including a first portion (51) and a second portion (64), the first portion (51) being fluidly linked to the second portion (64);
   a desiccant wheel (60) arranged between the first and second portions (51, 64);
   a second open air passage (44) including a first end portion (82) that leads to a second end portion (123) through an intermediate section (108), the first and second end portions (82, 123) being fluidly connected to the first portion (51) of the first open air passage (43) and the intermediate section (108) being fluidly linked to the desiccant wheel (60); and
   a condensing heat exchanger (114) fluidly connected to the intermediate section (108) of the second open air passage (44) downstream from the desiccant wheel (60), the condensing heat exchanger (114) extracting water from an air flow passing through the second open air passage (44).

2. The water-from-air extraction system (40) according to claim 1, wherein the second end portion (123) of the second open air passage (44) is fluidly connected to the first portion (51) of the first open air passage (43) through an ejector (130).

3. The water-from-air extraction system (40) according to claim 1, wherein the second open air passage (44) includes a first section (80), a second section (93) fluidly connected to the first section (80), a third section (104) fluidly connected to the second section (93) and a fourth section (120) fluidly connected to the third section (104), the desiccant wheel (60) being fluidly connected between the second and third sections (93, 104).

4. The water-from-air extraction system (40) according to claim 3, further comprising: a heater (90) fluidly connected between the first and second sections (80, 93) of the second open air passage (44).

5. The water-from-air extraction system (40) according to claim 1, further comprising: a water storage area (140) fluidly connected to the condensing heat exchanger (114).

6. The water-from-air extraction system (40) according to claim 1, wherein the second end portion (123) of the second open air passage (44) is fluidly connected to the first portion (51) of the first open air passage (43) down stream of the first end portion (82) of the second open air passage (44).

7. The water-from-air extraction system (40) according to claim 1, wherein the second open air passage (44) does not include an air motive device.

8. A method of extracting water from air, the method comprising:
   directing a first portion of process air into a first open air passage (43);
   directing a second portion of process air into a second open air passage (44) fluidly connected to the first open air passage (43);
   guiding the second portion of the process air through a desiccant wheel (60);

introducing the second portion of process air back into the first portion of process air at a mixing point (131) forming a mixed air stream; and extracting water from the second portion of process air upstream from the mixing point (131).

9. The method of claim 8, further comprising: heating the second portion of process air upstream from the desiccant wheel (60).

10. The method of claim 8, further comprising: passing the mixed air stream through the desiccant wheel (60).

11. The method of claim 8, further comprising: guiding the second portion of process air into the first portion of process air through an ejector (130) arranged at the mixing point (131).

12. The method of claim 8, further comprising: passing the second portion of process air through the second open air passage (44) without the aid of an air motive device arranged in the second open air passage (44).

* * * * *